United States Patent
Kashiba

Patent Number: 6,153,422
Date of Patent: Nov. 28, 2000

[54] OXYGEN ABSORBER FOR CULTURING ANAEROBIC BACTERIA

[75] Inventor: Takashi Kashiba, Kanagawa-ken, Japan

[73] Assignee: Mitsubishi Gas Chemical Company, Inc., Tokyo, Japan

[21] Appl. No.: 09/036,931

[22] Filed: Mar. 9, 1998

[30] Foreign Application Priority Data

Mar. 19, 1997 [JP] Japan ..................... 9-066411

[51] Int. Cl.⁷ ............... C12N 1/00; C12N 1/04; C12N 1/38
[52] U.S. Cl. .......... 435/243; 435/244; 435/260; 435/801; 252/188.28
[58] Field of Search ............... 435/262.5, 243, 435/244, 260, 801; 252/188.28

[56] References Cited

U.S. PATENT DOCUMENTS 4,524,015  6/1985  Takahashi et al. ............. 252/188.28

FOREIGN PATENT DOCUMENTS 0 120 111  10/1984  European Pat. Off. .
0 424 855  5/1991  European Pat. Off. .

OTHER PUBLICATIONS

Database WPI, Section Ch, Week 9346, Derwent Publications Ltd., London, GB, Class D13, AN 93–364446 of JP 05 269 376 A (Oct. 1993).

Primary Examiner—David M. Naff
Assistant Examiner—Deborah K. Ware
Attorney, Agent, or Firm—Frishauf, Holtz, Goodman, Langer & Chick, P.C.

[57] ABSTRACT

An oxygen absorber is provided which is obtainable by mixing 10 to 60 parts by weight of a particulate thermoplastic resin having a softening point of 90 to 125° C. and a particle diameter of 1 to 500 $\mu$m with 100 parts by weight of an oxygen absorbing composition containing an ascorbic acid compound, water and an activated carbon. The oxygen absorber can inhibit overheat to prevent spontaneous ignition. Further, the activated carbon has a particle diameter of 0.1 to 2 mm and the ascorbic acid compound includes L-ascorbic acid, sodium L-ascorbate, calcium L-ascorbate and sodium D-iso-ascorbate.

18 Claims, 1 Drawing Sheet

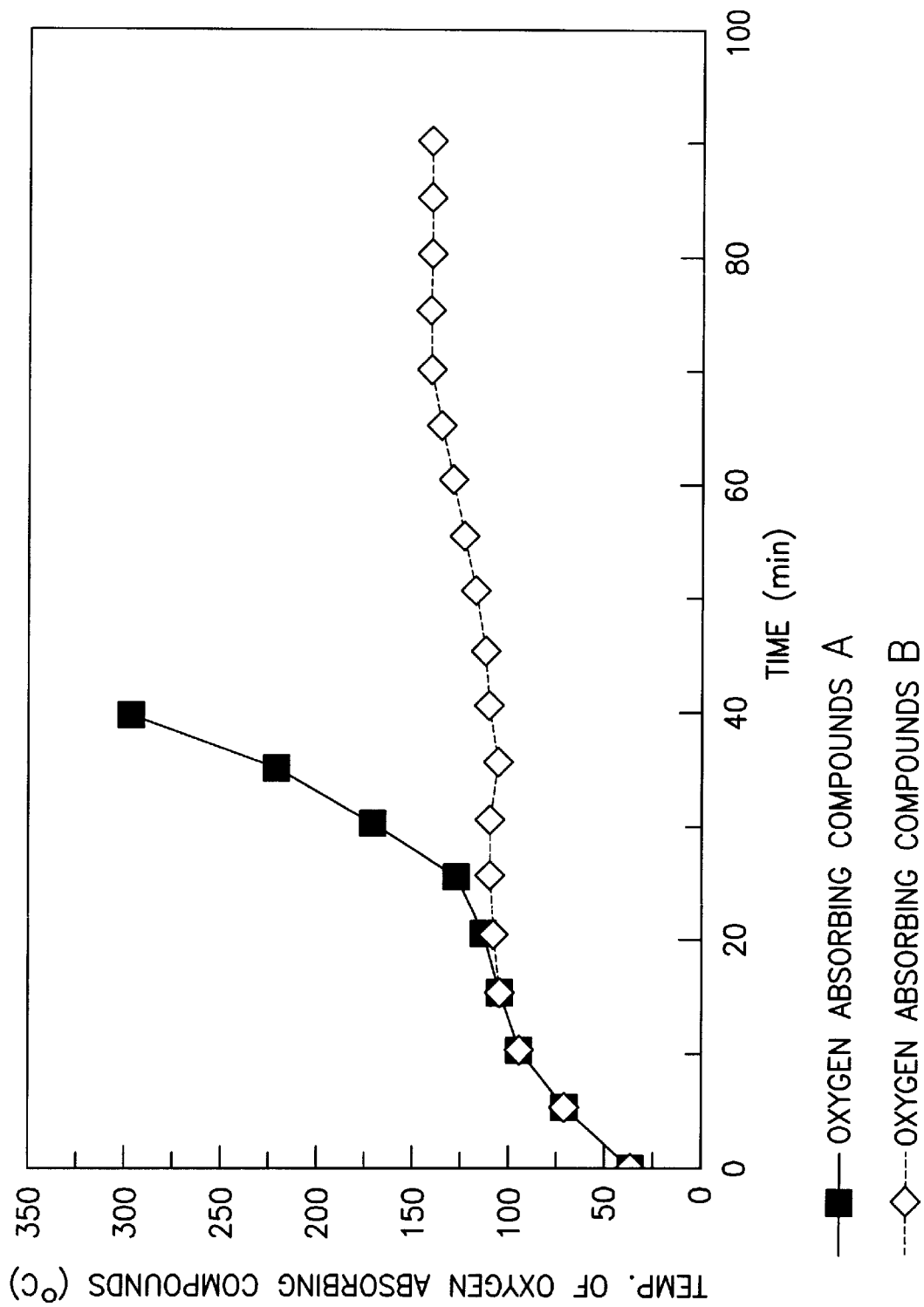

OXYGEN ABSORBER FOR CULTURING ANAEROBIC BACTERIA

BACKGROUND OF THE INVENTION

1. Field of the Invention

The present invention relates to an oxygen absorbing compound mainly comprising an ascorbic acid compound which does not bring about any spontaneous ignition in the air and which is free from any danger of overheat ignition during its use. More specifically, it relates to an oxygen absorbing compound obtained by mixing the particles of a thermoplastic resin with an oxygen absorbing composition consisting principally of an ascorbic acid compound, and a method for culturing anaerobic bacteria by the use of this oxygen absorbing compound.

2. Description of the Related Art

Oxygen absorbing compounds mainly comprising ascorbic acid compounds are known as raw materials of oxygen absorber which are used in packages of foods for the purpose of protecting the foods from mold, oxidation and the like. As the oxygen absorbing compounds which can be used in the oxygen absorbers, there are well known the oxygen absorbing compounds mainly comprising iron powders in addition to the oxygen absorbing compounds mainly comprising the ascorbic acid compounds. In food making, a metal detector has been used sometimes to prevent metallic matters such as needles from getting into the food packages, and the oxygen absorbers mainly comprising the iron powders are sensed by the metal detector. Therefore, they cannot be applied to such a use, and hence, in this case, the oxygen absorber mainly comprising the ascorbic acid compounds can be employed. The oxygen absorbers mainly comprising the ascorbic acid compounds emit a carbon dioxide gas substantially as much as the volume of absorbed oxygen, so that the volume of each package does not change. Thus, in the fields of the foods and the like in which the appearance change of each package due to the decrease in the gas volume in the package by the absorption of oxygen is unrecommendable, the oxygen absorbers mainly comprising the ascorbic acid compounds have been used. Furthermore, in medical institutions, the food makers and the like, the culture inspection of anaerobic bacteria has been carried out for the purpose of the inspection of disease-causing bacteria, food poisoning bacteria and food contaminating bacteria, but in order to culture the anaerobic bacteria, it is necessary that oxygen should be eliminated from a culture environment in a short period of time and the environment containing a carbon dioxide gas should be prepared. The oxygen absorbing compounds mainly comprising the ascorbic acid compounds are filled into packages having an excellent breathability, and they are used as gas concentration adjustors for the culture of the anaerobic bacteria.

The oxygen absorbing compound using the ascorbic acid compound can be obtained by mixing the ascorbic acid compound, an alkali powder, a metallic salt, water and an activated carbon, as disclosed in Japanese Patent Application Laid-open Nos. 136845/1976, 10884/1977, 98348/1979, 132246/1979 and 61914/1980. In addition, in Japanese Patent Application Laid-open Nos. 105288/1979 and 51890/1983, methods for culturing the anaerobic bacteria have been disclosed in which a carbon dioxide gas emitting performance of the oxygen absorbing compound using the ascorbic acid compound is utilized.

The oxygen absorbing compound mainly comprising the ascorbic acid compound absorbs oxygen in an oxidative reaction of the ascorbic acid compound, and therefore, heat is generated during this reaction. With the aid of the generated heat, the reaction is further accelerated, whereby the oxygen absorption can be achieved in a short period of time. However, the ascorbic acid compound which can be used as the principal ingredient is an organic compound which is combustible, and an activated carbon which is mixed with the ascorbic acid compound is also a combustible material designated in fire regulations (coals and charcoals). Therefore, when a large amount of the oxygen absorbing compound absorbs oxygen, when gas concentration adjustors prepared by filling the oxygen absorbing compound into breathable small bags are accumulated in large quantities and they absorb oxygen, or when the oxygen absorption is done at a high atmospheric temperature even in the presence of a small amount of the oxygen absorbing compound, the generation of the reaction heat increases, and as a result, there is a fear that the combustible components in the oxygen absorbing composition may spontaneously ignite. Accordingly, this kind of oxygen absorbing compound is required to be sufficiently carefully handled in consideration of the danger of the spontaneous ignition during storage, use, disposal and the like.

In addition, a technique of controlling the overheat of the oxygen absorbing compound is also known. For example, Japanese Patent Application Laid-open No. 269376/1993 has disclosed a method in which an inorganic filler is used as a carrier to inhibit the danger of the spontaneous ignition. However, in the case that the inorganic filler is used as the carrier, a large amount of the heat is absorbed by the inorganic filler, so that the sufficient generation of the heat does not occur and the progress of the oxygen absorbing reaction retards. Therefore, there is a drawback that a large amount of the oxygen absorber is required in order to complete the oxygen absorption in a short time.

Moreover, Japanese Patent Application Laid-open No. 188288/1991 has disclosed a method which comprises adding a thermally meltable additive to a rust preventive mainly comprising an unsaturated fatty acid to inhibit the overheat. However, since the rust preventive does not generate any carbon dioxide gas and emits a bad odor, it cannot be used as the oxygen absorbing compound which can be used in the gas concentration adjustor for the culture of the anaerobic bacteria and the oxygen absorber for foods.

SUMMARY OF THE INVENTION

An object of the present invention is to provide an oxygen absorbing compound which has been developed to improve the above-mentioned conventional oxygen absorbing compounds and which can maintain an excellent oxygen absorbing performance of the oxygen absorbing compound containing an ascorbic acid compound as a principal ingredient and an activated carbon, and can inhibit overheat to prevent spontaneous ignition.

That is to say, the present invention is directed to an oxygen absorbing compound which is obtainable by mixing 10 to 60 parts by weight of a particulate thermoplastic resin having a softening point of 90 to 125° C. and a particle diameter of 1 to 500 $\mu$m with 100 parts by weight of an oxygen absorbing compound containing an ascorbic acid compound, water and an activated carbon, as a means for solving the above-mentioned problems.

In the oxygen absorbing compound of the present invention, the particle diameter of the thermoplastic resin is usually in the range of 1 to 500 $\mu$m, but it is preferably in the range of 10 to 300 $\mu$m. No particular restriction is put on the kind of thermoplastic resin, and various thermoplastic resins can be used, but they are preferably polyethylene, polypropylene and mixtures thereof.

The oxygen absorbing compound of the present invention takes the above-mentioned constitution to prevent ignition by overheat. That is to say, the oxygen absorbing compound comprising the ascorbic acid, water and an activated carbon can usually be wrapped in breathable bags and then used in the form of oxygen absorbing packages. However, when a large number of the oxygen absorbing packages is stacked and comes in contact with air, or when an atmospheric temperature extraordinarily rises during the use of these packages, heat is rapidly generated by an excessive oxidation reaction on occasion. In the case that the oxygen absorbing compound reacts with oxygen to bring about a temperature rise, water contained in the oxygen absorbing compound is evaporated, so that the temperature rise becomes temporarily slow in the vicinity of 90 to 125° C., even if the temperature rapidly rises to some extent. However, if the excessive heat generation and the overheat are present, the evaporation of water does not catch up with the heat generation and the overheat, so that the temperature of the oxygen absorbing compound rapidly rises beyond the above-mentioned temperature range, which leads to a danger that an activated carbon which is a combustible substance tends to ignite (refer to FIG. 1).

However, according to the present invention, an oxygen absorbing compound can be obtained by adding particles of a thermoplastic resin to an oxygen absorbing compound comprising the above-mentioned ascorbic acid, water and the activated carbon and mixing them, so that when the temperature of the oxygen absorber has reached about 90 to 125° C. mentioned above, the added thermoplastic resin is softened to cover the surfaces of the oxygen absorbing compound and to thereby inhibit an excessive oxidation reaction of the oxygen absorbing compound, with the result that there can be suppressed the extraordinary heat generation of the oxygen absorbing compound in which a water content has been decreased. Furthermore, in the oxygen absorbing compound of the present invention, a normal oxygen absorption reaction is not disturbed, even if the particles of the thermoplastic resin are added thereto. Therefore, the oxygen absorbing compound of the present invention can suitably be used as an oxygen absorber for the storage of foods, a gas concentration adjustor for the culture of anaerobic bacteria and the like.

BRIEF DESCRIPTION OF THE DRAWING

FIG. 1 shows a temperature change of an oxygen absorbing compound in a test of Packing Group II for spontaneous combustion in accordance with "Recommendation on the transport of dangerous goods", United Nations.

DESCRIPTION OF SUITABLE EMBODIMENTS OF THE INVENTION

Next, the present invention will be described in more detail.

In the present invention, examples of an ascorbic acid compound include L-ascorbic acid, sodium L-ascorbate, calcium L-ascorbate and sodium D-iso-ascorbate, and they may be used singly or in the form of a mixture thereof. The ascorbic acid compound is used in the state of an aqueous solution, and this aqueous solution is preferably allowed to permeate through an activated carbon. As the concentration of the aqueous ascorbic acid compound solution is high, the amount of the activated carbon can be decreased, and the concentration of the ascorbic acid compound is preferably close to a saturated solubility as much as possible. Furthermore, the necessary amount of water can sufficiently be secured by using the ascorbic acid compound in the state of the aqueous solution. Therefore, the ascorbic acid compound is preferably a salt having a high solubility, and typically, sodium L-ascorbate is preferable.

As the activated carbon, there can be used an activated carbon prepared from a raw material such as a sawdust, a coal or coconut shells in a suitable manner such as a water vapor activation, a drug activation or a carbon dioxide gas activation. The activated carbon is preferably particulate, because the aqueous solution of the ascorbic acid compound is supported on the particulate activated carbon, these particles are filled into small bags and then used. The particle diameter of the particulate activated carbon is preferably in the range of 0.1 to 2 mm, more preferably 0.5 to 1 mm. If the particle diameter of the particulate activated carbon is less than the above-mentioned range, the flowability of the oxygen absorber is poor, so that the automatic filling of the oxygen absorbing compound is difficult. On the other hand, if the particle diameter of the particulate activated carbon is too large, an oxygen absorption performance deteriorates, and there might occur a problem that the particles of the oxygen absorbing compound break a package and the contents in the package spill out.

In the oxygen absorbing compound of the present invention, additives such as carbonates and metallic compounds can be added to the ascorbic acid compound, if necessary. Examples of the preferable carbonates include water-soluble carbonates such as sodium carbonate, sodium hydrogencarbonate and sodium carbonate hydrate. The amount of the carbonate to be blended is preferably in the range of 10 to 30 parts by weight with respect to 100 parts by weight of the ascorbic acid compound. Examples of the preferable metallic compounds include anhydrous salts and water-containing salts of ferrous chloride, ferric chloride, ferric sulfate, ferrous sulfate, manganese chloride, zinc sulfate, copper sulfate and copper chloride. The amount of the metallic compound to be blended is preferably in the range of 5 to 20 parts by weight with respect to 100 parts by weight of the ascorbic acid compound.

No particular restriction is put on a preparation method of the oxygen absorbing compound according to the present invention, but a method is preferable which comprises preparing an oxygen absorbing composition from the above-mentioned components, and then mixing this compound with the particles of the undermentioned thermoplastic resin. As the preparation method of the oxygen absorbing composition, for example, there is a method which comprises dissolving the carbonate or the metallic compound in the aqueous solution of the ascorbic acid compound, and then mixing the resulting solution with the activated carbon to impregnate the latter with the former, or a method which comprises dissolving the metallic compound in the aqueous solution of the ascorbic acid compound, and then mixing the resulting solution with a mixture of the carbonate and the activated carbon.

The thermoplastic resin which can be used in the present invention preferably has a softening point of 90 to 125° C., and examples of the thermoplastic resin include polyethylene, polypropylene, ethylene-vinyl acetate copolymers, elastomers and mixtures thereof. Polyolefins such as low-molecular weight polyethylene and polypropylene having a molecular weight of 10000 or less are particularly preferable. Furthermore, also from a viewpoint that the influence of a bad odor is inhibited by adding to the oxygen absorbing composition, polyethylene, polypropylene and mixtures thereof are particularly preferable. If the softening point of the added thermoplastic resin is too low, the usual oxygen absorbing reaction is disturbed. On the other hand, the softening point of the thermoplastic resin is too high, the resin cannot be softened, even if the temperature of the oxygen absorber is in excess of the range of 90 to 125° C., so that the excessive exothermic reaction of the oxygen absorber cannot be restrained.

Since the thermoplastic resin is required to effectively cover the activated carbon impregnated with the main agent solution at the mixing with the oxygen absorbing composition, the particle diameter of the thermoplastic resin is preferably in the range of 1 to 500 μm, more preferably 10 to 300 μm. If the particle diameter is too small, the flowability of the oxygen absorbing compound is poor, so that the mechanical filling of the oxygen absorbing compound is difficult. On the other hand, if the particle diameter is too large, the thermoplastic resin cannot effectively cover the oxygen absorber when a temperature rises to soften the thermoplastic resin, so that the danger of the spontaneous ignition cannot be restrained.

The amount of the thermoplastic resin to be blended is preferably in the range of 10 to 60 parts by weight, more preferably 15 to 40 parts by weight with respect to 100 parts by weight of the oxygen absorbing composition. If the amount of the thermoplastic resin is less than the above-mentioned range, an intended heat generation restraint effect is low, and on the other hand, if it is too large, a heat quantity taken by the resin increases, so that the progress of the reaction retards and the volume of the oxygen absorbing compound increases. In the matter of the addition of the thermoplastic resin, the kind, particle diameter and amount of the resin can suitably be decided in consideration of a composition, properties, a use purpose and the like.

The obtained oxygen absorbing compound is excellent in oxygen absorption ability, is not sensed by a metal detector, and generates a carbon dioxide gas in about the same volume as that of the absorbed oxygen. Therefore, the oxygen absorbing compound can directly be applied to uses of foods and the like for which a conventional ascorbic acid-containing oxygen absorber has been used. Furthermore, even when the oxygen absorber is used in large quantities, or even when it is filled into packages having an excellent breathability, any danger of the spontaneous ignition is not present, and therefore, it can suitably be used as a gas concentration adjustor for the culture of anaerobic bacteria in a medical institution or the like.

Next, the present invention will be described in more detail in accordance with examples.

Example 1 and Comparative Example 1

6 g of ferrous sulfate heptahydrate and 10 g of sodium carbonate decahydrate were dissolved in 100 g of an aqueous sodium L-ascorbate solution (45% by weight), and 60 g of a granular activated carbon (an average particle diameter= 0.6 mm) was impregnated with the total amount of the resulting solution to obtain an oxygen absorbing compound A (Comparative Example 1).

Next, 25 g of a low-molecular weight polyethylene [softening point=105° C.: JIS (Japanese Industrial Standard) K2531] having an average particle diameter of 200 μm and an average molecular weight of 2000 was added to 100 g of the oxygen absorbing compound A, and they were then mixed to obtain an oxygen absorbing compound B (Example 1).

For the oxygen absorbing compound A and the oxygen absorbing compound B, a spontaneous ignition danger test was made. This test was concerned with to classify spontaneous combustion to the Packing Group II, and it was done in accordance with "Test method for self-heating substance" described in "Recommendation on transport of dangerous goods", United Nations. That is to say, a 2.5 cm cube sample container (a wire gauze of 100 mesh was used) was put in the center of a hot air circulating type thermostatic chamber in which a temperature was set to 140° C., and it was tested as to whether the sample filled into this sample container ignited within 24 hours or the temperature of the sample exceeded 200° C. According to this test, the oxygen absorbing compound A (Comparative Example 1) ignited in about 30 minutes, but the oxygen absorbing compound B (Example 1) did not ignite even after a lapse of 24 hours, and in this case, the temperature of the oxygen absorbing compound A did not exceed 140° C. In the case of the oxygen absorbing compound B (Example 1), it can be presumed from the above-mentioned fact that the added thermoplastic resin is softened prior to the ignition when the temperature rises, so that the softened resin effectively covers the oxygen absorbing compound to suitably shut off oxygen, whereby heat generation is inhibited and hence the temperature does not rise up to an ignition point.

Each of 1 cc of the oxygen absorbing compound B (Example 1) and 1 cc of the oxygen absorbing compound A (Comparative Example 1) was filled into a breathable small bag of a Japanese paper laminated with a perforated polyethylene film to prepare oxygen absorbing packages. Each of these packages was put in a gas barrier bag of laminated films of a polyvinylidene chloride-covered nylon and polyethylene together with 150 cc of air, and the bag was then sealed up. These bags were maintained at 25° C., and changes with time of an oxygen concentration and a carbon dioxide gas concentration in each bag were inspected. The results are shown in Table 1, and it is apparent that the oxygen absorbing compound B exerts the same oxygen absorbing performance as in the oxygen absorbing compound A to which any thermoplastic resin is added.

Furthermore, an apparent density (a light bulk density; JIS K6721) of each oxygen absorbing compound was measured. As a result, the apparent density of the oxygen absorbing compound A was 0.53 g/cc, and that of the oxygen absorbing compound B was 0.52 g/cc. These results are scarcely different from each other, and both of these absorbers were excellent in flowability.

Comparative Example 2

6 g of ferrous sulfate heptahydrate and 10 g of sodium carbonate decahydrate were dissolved in 100 g of an aqueous sodium L-ascorbate solution (45% by weight), and 60 g of a granular diatomaceous earth (an average particle diameter=0.6 mm) was impregnated with 65 g of the resulting solution to obtain an oxygen absorbing compound C (Comparative Example 2). In this case, at a point when 60 g of the granular diatomaceous earth was impregnated with 65 g of the solution, flowability deteriorated and further impregnation was impossible any more. In addition, an apparent density of the oxygen absorbing compound C was 0.65 g/cc.

Next, 1 cc of this oxygen absorbing compound C was filled into breathable small bags to prepare oxygen absorbing packages as in Example 1, and for these packages, an oxygen absorption test was made in the same manner as in Example 1. The obtained results were shown in Table 1, and it was apparent that the oxygen absorbing ability of the oxygen absorbing compound C was much worse than the other oxygen absorbers.

TABLE 1

|  |  | Gas Conc. in Bag (%) | | |
|---|---|---|---|---|
|  |  | after 2 hr | after 4 hr | after 6 hr |
| Oxygen Absorbing Compound B (Example 1) | $O_2$ Conc. | 0.25 | <0.1 | <0.1 |
|  | $CO_2$ Conc. | 19.5 | 20.6 | 21.5 |
| Oxygen Absorbing Compound A (Comp. Ex. 1) | $O_2$ Conc. | 0.24 | <0.1 | <0.1 |
|  | $CO_2$ Conc. | 19.6 | 21.0 | 21.6 |
| Oxygen Absorbing Compound C (Comp. Ex. 2) | $O_2$ Conc. | 4.1 | 1.4 | 0.35 |
|  | $CO_2$ Conc. | 13.1 | 16.7 | 18.5 |

Comparative Example 3

5 g of a low-molecular weight polyethylene (softening point=105° C.; JIS K2531) having an average particle diameter of 200 μm and an average molecular weight of 2000 was added to 100 g of the oxygen absorbing compound A prepared in the same manner as in Comparative Example 1, followed by mixing, to obtain an oxygen absorbing compound D. For this oxygen absorbing compound D, a test of Packing Group II was made as in Example 1, and as a result, the oxygen absorbing compound D ignited in about 35 minutes.

Comparative Example 4

25 g of a low-molecular weight polyethylene (softening point=105° C.; JIS K2531) having an average particle diameter of 1 mm and an average molecular weight of 2000 was added to 100 g of the oxygen absorbing compound A prepared in the same manner as in Comparative Example 1, followed by mixing, to obtain an oxygen absorbing compound E. For this oxygen absorbing compound E, a test of Packing Group II was made as in Example 1, and as a result, the oxygen absorbing compound E ignited in about 30 minutes.

Comparative Example 5

25 g of a low-molecular weight polypropylene (softening point=152° C.; JIS K2531) having an average particle diameter of 200 μm and an average molecular weight of 3000 was added to 100 g of the oxygen absorbing compound A prepared in the same manner as in Comparative Example 1, followed by mixing, to obtain an oxygen absorbing compound F. For this oxygen absorbing compound F, a test of Packing Group II was made as in Example 1, and as a result, the oxygen absorbing compound F ignited in about 40 minutes.

As is apparent from the above-mentioned results, in the case that the particles of the thermoplastic resin were added as in the oxygen absorbing compound B but the amount of the same resin was small (the oxygen absorbing compound D), in the case that the same amount of the same resin was used but the particle diameter of the resin was larger (the oxygen absorbing compound E), and in the case that the resin having the high softening point was used (the oxygen absorbing compound F), the addition effect of the thermoplastic resin was poor and hence, heat generation could not be inhibited, so that the ignition occurred.

Example 2

2 g of an oxygen absorbing compound B prepared in Example 1 was filled into each of small bags of a Japanese paper laminated with a perforated polyethylene film to prepare oxygen absorbing packages. One of these packages and 200 g of sponge cake were put in a gas barrier bag of laminated films of a polyvinylidene chloride-covered nylon and polyethylene together with 150 cc of air, and the gas barrier bag was then sealed up. The bag was maintained at room temperature for two weeks. After one day, it was confirmed that an oxygen concentration in the bag was 0.1% or less, and after two weeks, the bag was opened and a taste of the sponge cake was then observed. As a result, the taste was good, and the quality of the sponge cake was maintained.

Example 3 and Comparative Example 6

An oxygen absorbing compound B of Example 1 and an oxygen absorbing compound A of Comparative Example 1 were filled into bags (100×140 mm) made of a Japanese paper laminated with a perforated polyethylene film in an amount of 20 g, respectively, to prepare a gas concentration adjustor B (Example 3) and a gas concentration adjustor A (Comparative Example 6).

On the other hand, one platinum loopful of *Clostridium boturinum* (Sample bacteria No. 1) which grew in a GAM agar culture medium (made by Nissui Seiyaku Co., Ltd.) was suspended in 9 ml of a dilute solution for anaerobic bacteria (hereinafter referred to as "the dilute solution") whose oxidation-reduction potential is lowered by adding L-cysteine or the like, and the suspension was further diluted to $10^7$ every 10 times to prepare the dilute solutions.

Two plastic petri dishes containing the poured and solidified GAM agar culture medium were inoculated with 0.1 ml of each dilute solution. Next, one of the plastic petri dishes was put in a bag made of a gas barrier film (comprising a polyvinylidene chloride-covered nylon and polyethylene) together with the gas concentration adjustor B (Example 3) and 2500 ml of air, and the other of the plastic petri dishes was put in the bag together with the gas concentration adjustor A and 2500 ml of air, followed by sealing the bag up.

*Bacteroides fragilis* (Sample bacteria No. 2) and *Propionibacterium acnes* (Sample bacteria No. 3) were each put in the bag of the gas barrier film together with each of the gas concentration adjustors B and A, as the same way as *Clostridium boturinum*.

Each gas barrier film bag containing the culture medium inoculated with the anaerobic bacteria and the gas concentration adjustor was maintained at 37° C. for 3 days for the sake of cultivation, and the bag was opened and the number of colonies appeared on the agar culture medium and the diameters of the colonies were then measured.

As shown in Table 2, the obtained results indicate that in the case that the gas concentration adjustor of Example 3 was used, all kinds of anaerobic bacteria successfully grew, and a growth supporting ability of the anaerobic bacteria in Example 3 were equal to that of Comparative Example 6 in which the gas concentration adjustor A was used.

TABLE 2

|  |  | Number of Colonies | | | Diameter of Colonies |
|---|---|---|---|---|---|
|  |  | $10^5$ | $10^6$ | $10^7$ | (mm) |
| C. boturinum Sample | Gas Conc. Adjustor B | 36 | 3 | — | 4.9 |

TABLE 2-continued

| | | Number of Colonies | | | Diameter of Colonies |
|---|---|---|---|---|---|
| | | $10^5$ | $10^6$ | $10^7$ | (mm) |
| Bacteria No. 1 | Gas Conc. Adjustor A | 32 | 3 | — | 4.9 |
| *B. fragilis* Sample | Gas Conc. Adjustor B | * | 71 | 7 | 3.2 |
| Bacteria No. 2 | Gas Conc. Adjustor A | * | 51 | 6 | 2.7 |
| *P. acnes* Sample | Gas Conc. Adjustor B | * | 251 | 38 | 0.8 |
| Bacteria No. 3 | Gas Conc. Adjustor A | * | 261 | 24 | 0.7 |

The mark * means that the measurement was impossible (the number of the colonies = 500 or more).

An oxygen absorbing compound of the present invention is a safe oxygen absorbing compound in which the danger of spontaneous ignition is extremely low even if a large amount of the oxygen absorbing compound is accumulated or if an atmospheric temperature is extraordinarily high, and its performances such as oxygen absorbing ability and flowability are comparable to those of a conventional oxygen absorbing compound mainly comprising an ascorbic acid compound. In addition, the oxygen absorbing compound of the present invention can compactly be received in oxygen absorbing packages, and hence it is excellent in practicality. In particular, the oxygen absorbing compound of the present invention can be put in each oxygen absorbing package in a large amount, and therefore, the oxygen absorbing compound can suitably be used for the culture of the anaerobic bacteria in which a relatively large amount of the oxygen absorbing compound is required.

What is claimed is:

1. An oxygen absorber comprising a particulate mixture of
   (a) 10 to 60 parts by weight of a particulate thermoplastic resin having a softening point of 90 to 125° C. and a particle diameter of 1 to 500 μm and
   (b) 100 parts by weight of a particulate oxygen absorbing composition containing an ascorbic acid compound, water and an activated carbon.

2. The oxygen absorber according to claim 1 wherein the thermoplastic resin is polyethylene, polypropylene or a mixture thereof.

3. The oxygen absorber according to claim 2, wherein the, thermoplastic resin has a particle diameter of 10 to 300 μm.

4. The oxygen absorber according to claim 3, wherein the ascorbic acid compound is selected from the group consisting of at least one of L-ascorbic acid, sodium L-ascorbate, calcium L-ascorbate and sodium D-iso-ascorbate.

5. The oxygen absorber according to claim 4, wherein the ascorbic acid compound is present in an aqueous solution.

6. The oxygen absorber according to claim 5, wherein the activated carbon has a particle diameter of 0.1 to 2 mm.

7. The oxygen absorber according to claim 5, wherein the ascorbic acid compound is sodium L-ascorbate.

8. The oxygen absorber according to claim 7, wherein the activated carbon has a particle diameter of 0.5 to 1 mm.

9. The oxygen absorber according to claim 8, wherein the thermoplastic resin is in an amount of 15 to 40 parts by weight with respect to 100 parts by weight of the oxygen absorbing composition.

10. The oxygen absorber according to claim 9, wherein the thermoplastic resin is polyethylene or polypropylene having a molecular weight of 10,000 or less.

11. The oxygen absorber according to claim 10, wherein the thermoplastic resin is in an amount of 15 to 40 parts by weight with respect to 100 parts by weight of the oxygen absorbing composition and the thermoplastic resin has a molecular weight of 10,000 or less and is polyethylene or polypropylene.

12. The oxygen absorber according to claim 1, wherein the thermoplastic resin is in an amount of 15 to 40 parts by weight with respect to 100 parts by weight of the oxygen absorbing composition.

13. The oxygen absorber according to claim 1, wherein an additive is added to the ascorbic acid compound, the additive being selected from the group consisting of (i) a carbonate selected from the group consisting of sodium carbonate, sodium hydrogen carbonate and sodium carbonate hydrate; and (ii) a metallic compound selected from the group consisting of ferrous chloride, ferric chloride, ferric sulfate, ferrous sulfate, manganese chloride, zinc sulfate, copper sulfate and copper chloride.

14. The oxygen absorber according to claim 13, wherein the additive is the carbonate, said carbonate being in an amount of 10 to 30 parts by weight with resect to 100 parts by weight of the ascorbic acid compound.

15. The oxygen absorber according to claim 13, wherein the additive is the metallic compound, said metallic compound being in an amount of 5 to 20 parts by weight with respect to 100 parts by weight of the ascorbic acid compound.

16. An oxygen absorbing package comprising a gas permeable package filled with the oxygen absorber of claim 1.

17. An oxygen absorbing package for culturing an anaerobic bacteria, the oxygen absorbing package being obtained by filling the oxygen absorber of claim 1 into a gas permeable package.

18. A method for culturing anaerobic bacteria which comprises culturing an anaerobic bacteria in the presence of the oxygen absorbing package of claim 17.

* * * * *